United States Patent [19]

Yeske et al.

[11] Patent Number: 5,541,281
[45] Date of Patent: Jul. 30, 1996

[54] LOW SURFACE ENERGY POLYISOCYANATES AND THEIR USE IN ONE- OR TWO-COMPONENT COATING COMPOSITIONS

[75] Inventors: Philip E. Yeske; Edward P. Squiller, both of Pittsburgh, Pa.; William E. Slack, Moundsville, W. Va.

[73] Assignee: Bayer Corporation, Pittsburgh, Pa.

[21] Appl. No.: 359,777

[22] Filed: Dec. 20, 1994

[51] Int. Cl.$^6$ .................................... C08G 18/28
[52] U.S. Cl. ............... 528/70; 252/182.15; 252/182.2; 528/49; 528/59; 528/67; 528/73; 544/193; 544/222; 560/25; 560/26; 560/167
[58] Field of Search ............... 252/182.15, 182.2; 528/70, 59, 49, 73, 67; 544/193, 222; 560/25, 26, 167

[56] References Cited

U.S. PATENT DOCUMENTS

| | | | |
|---|---|---|---|
| 4,160,080 | 7/1979 | Köenig et al. | 528/59 |
| 4,738,991 | 4/1988 | Narayan | 521/124 |
| 5,254,660 | 10/1993 | Kirchmeyer et al. | 528/49 |

OTHER PUBLICATIONS

DuPont–Zonyl® Fluorsurfactants, pp. 1–12 Aug. 1993.
DuPont–Zonyl® Fluorochemical Intermediates pp. 1–15 Aug. 1993.

*Primary Examiner*—Rachel Johnson
*Attorney, Agent, or Firm*—Joseph C. Gil; Thomas W. Roy

[57] ABSTRACT

The present invention is directed to a polyisocyanate mixture i) having an NCO content of 5 to 35% by weight and prepared from an organic diisocyanate, ii) containing less than 5% by weight of isocyanurate groups (calculated as $N_3$, $C_3$, $O_3$, MW 126), iii) containing allophanate groups in an amount such that there are more equivalents of allophanate groups than urethane groups and iv) containing fluorine (calculated as F, AW 19) in an amount of 0.001 to 50% by weight, based on solids., wherein fluorine is incorporated with compounds containing two or more carbon atoms, one or more hydroxyl groups and one or more fluorine atoms. The present invention is also directed to a process for the production of this polyisocyanate mixture and to its use, optionally in blocked form, as an isocyanate component in one- or two-component coating compositions.

20 Claims, No Drawings

LOW SURFACE ENERGY POLYISOCYANATES AND THEIR USE IN ONE- OR TWO-COMPONENT COATING COMPOSITIONS

BACKGROUND OF THE INVENTION

1. Field of the Invention

The present invention is directed to low surface energy polyisocyanates which contain allophanate groups and fluorine, to blends of these polyisocyanates with other polyisocyanates which do not contain fluorine and to the use of either of these polyisocyanates in one- or two-component coating compositions.

2. Description of the Prior Art

Polyurethane coating compositions containing a polyisocyanate component, in either blocked or unblocked form and an isocyanate reactive component, generally a high molecular weight polyol, are well known. Although coatings prepared from these compositions possess many valuable properties, one property, in particular, which needs to be improved is the surface quality. It can be difficult to formulate coating compositions to obtain a coating having a smooth surface as opposed to one containing surface defects such as craters, etc.

It is believed that these difficulties are related to the high surface tension of the two-component coating compositions. Another problem caused by the high surface tension is the difficulty in cleaning the coatings. Regardless of their potential application area, there is a high likelihood that the coatings will be subjected to stains, graffiti, etc.

Accordingly, it is an object of the present invention to provide coating compositions which have reduced surface tension and, thus, are suitable for the production of coatings having an improved surface. It is an additional object of the present invention to provide coating compositions which have improved cleanability. It is a final object of the present invention to provide coating compositions which satisfy these requirements without substantially affecting the other valuable properties of the known polyurethane coatings.

Surprisingly, these objectives may be achieved by formulating the two-component coating compositions with the polyisocyanates according to the present invention containing allophanate groups and fluorine which are described hereinafter.

SUMMARY OF THE INVENTION

The present invention is directed to a polyisocyanate mixture
i) having an NCO content of 5 to 35% by weight and prepared from an organic diisocyanate,
ii) containing less than 5% by weight of isocyanurate groups (calculated as $N_3C_3O_3$, MW 126),
iii) containing allophanate groups in an amount such that there are more equivalents of allophanate groups than urethane groups and
iv) containing fluorine (calculated as F, AW 19) in an amount of 0.001 to 50% by weight, based on solids,
wherein the preceding percentages are based on the solids content of the polyisocyanates, excluding any unreacted organic diisocyanate, and wherein fluorine is incorporated by reacting an isocyanate group with a compound containing two or more carbon atoms, one or more hydroxyl groups and one or more fluorine atoms to form urethane groups and converting a sufficient amount of these urethane groups to allophanate groups to satisfy the requirements of iii), provided that the polyisocyanate mixture contains sufficient allophanate groups to ensure that the polyisocyanate mixture remains stable and homogeneous in storage for 3 months at 25° C.

The present invention is also directed to a process for the production of this polyisocyanate mixture by a) reacting a portion of the isocyanate groups of an organic diisocyanate with 0.01 to 500 millimoles, per mole of organic diisocyanate, of a compound containing two or more carbon atoms, one or more hydroxyl groups and one or more fluorine atoms to the organic diisocyanate to form urethane groups, b) adding an allophanatization catalyst prior to, during or after step a), c) converting a sufficient amount of the urethane groups formed in step a) to allophanate groups such that there are more equivalents of allophanate groups than urethane groups, d) terminating the allophanatization reaction at the desired degree of allophanatization by adding a catalyst poison and/or by thermally deactivating the catalyst and e) optionally removing unreacted organic diisocyanate.

The present invention also relates to the use of these polyisocyanate mixtures, optionally in blocked form, as an isocyanate component in one- or two-component coating compositions.

DETAILED DESCRIPTION OF THE INVENTION

Copending application, U.S. Ser. No. 08/306,553, is also directed to low surface energy polyisocyanates and their use in two-component coating compositions. However, the polyisocyanates disclosed therein contain at least 5% by weight of isocyanurate groups.

In accordance with the present invention the term "(cyclo)aliphatically bound isocyanate groups" means aliphatically and/or cycloaliphatically bound isocyanate groups. The term "monoalcohol" means a compound containing one aliphatically, cycloaliphatically, araliphatically or aromatically bound hydroxyl group.

In a preferred embodiment of the present invention the polyisocyanate mixtures are prepared from organic diisocyanates represented by the formula,

$$R(NCO)_2$$

wherein R represents an organic group obtained by the removing the isocyanate groups from an organic diisocyanate having aromatically or preferably (cyclo)aliphatically bound isocyanate groups and a molecular weight of 140 to 400. Preferred diisocyanates for the process according to the invention are those represented by the above formula wherein R represents a divalent aliphatic hydrocarbon group having from 4 to 18 carbon atoms, a divalent cycloaliphatic hydrocarbon group having from 5 to 15 carbon atoms, a divalent aromatic hydrocarbon group having 6 to 15 carbon atoms or a divalent araliphatic hydrocarbon group having from 7 to 15 carbon atoms.

Examples of the organic diisocyanates which are particularly suitable for the process include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 1,3- and 1,4-bis(isocyanatomethyl)-cyclohexane, bis-(4-isocyanato-3-methyl-cyclohexyl)-methane, xylylene diisocyanate, α,α,α',α'-tetramethyl- 1.3-and/or-1,4-xylylene diisocyanate, 1-isocyanato-1-methyl- 4(3)-isocycanatomethyl cyclohexane, 2,4- and/or 2,6-hexahydrotoluylene diisocyanate, 2,4- and/or 2,6-toluene diisocyanate, 2,4- and/or 4,4'-diphenyl methane diisocyanate. Mixtures of these diisocyanates may also be used. Preferred diisocyanates are 1,6-hexamethylene diisocyanate, isophorone diisocyanate and bis-(4-isocyanatocyclohexyl)-methane; 1,6-hexamethylene diisocyanate is especially preferred.

It is also possible in accordance with the present invention to use blends of the previously mentioned diisocyanates with monoisocyanates or polyisocyanates having 3 or more isocyanate groups.

Suitable methods for preparing the allophanate group containing polyisocyanates are known and described in U.S. Pat. Nos. 3,769,318, 4,160,080 and 4,177,342 and 4,738,991, the disclosures of which are herein incorporated by reference. The allophanatization reaction may be conducted at a temperature of 50° to 250° C., preferably 60° to 150° C. The reaction may be terminated by reducing the reaction temperature, by removing the catalyst, e.g., by applying a vacuum, or by the addition of a catalyst poison. After the reaction is terminated, unreacted monomeric diisocyanates may be removed, e.g., by thin film evaporation.

The allophanatization of the starting diisocyanate mixture may be carried out in the absence or in the presence of solvents which are inert to isocyanate groups. Depending on the area of application of the products according to the invention, low to medium-boiling solvents or high-boiling solvents can be used. Suitable solvents include esters such as ethyl acetate or butyl acetate; ketones such as acetone or butanone; aromatic compounds such as toluene or xylene; halogenated hydro-carbons such as methylene chloride and trichloroethylene; ethers such as diisopropylether; and alkanes such as cyclohexane, petroleum ether or ligroin.

In accordance with the present invention urethane groups and preferably allophanate groups are incorporated into the polyisocyanates by the use of compounds containing two or more carbon atoms, one or more hydroxyl groups (preferably one or two hydroxyl groups, more preferably one) and one or more fluorine atoms (preferably in the form of fluoroalkyl groups such as —$CF_2$—). Examples of these compounds include aliphatic, cycloaliphatic, araliphatic or aromatic hydroxy group-containing compounds, which contain two or more carbon atoms and also contain fluorine atoms, preferably fluoroalkyl groups. The compounds may be linear, branched or cyclic and have a molecular weight (number average molecular weight as determined by gel permeation chromatography using polystyrene as standard) of up to 50,000, preferably up to 10,000, more preferably up to 6000 and most preferably up to 2000. These compounds generally have OH numbers of greater than 5, preferably greater than 25 and more preferably greater than 35. The hydroxy group-containing compounds may optionally contain other hetero atoms in the form of, e.g., ether groups, ester groups, carbonate groups, acrylic groups, etc.

Thus, it is possible in accordance with the present invention to use the known polyols from polyurethane chemistry, provided that they contain fluorine, e.g. by using fluorine-containing alcohols, acids, unsaturated monomers, etc. in the preparation of these polyols. Examples of these polyols, which may be prepared from fluorine-containing precursors and used in accordance with the present invention, are disclosed in U.S. Pat. No. 4,701,480, the disclosure of which is herein incorporated by reference. Additional examples of suitable fluorine-containing compounds are disclosed in U.S. Pat. Nos. 5,294,662 and 5,254,660, the disclosures of which are herein incorporated by reference.

Preferred for use according to the invention are compounds containing one or more hydroxyl groups, preferably one or two hydroxyl groups and more preferably one hydroxyl group; one or more fluoroalkyl groups; optionally one or more methylene groups; and optionally other hetero atoms such as ether groups. These compounds preferably have a molecular weight of less than 2000 or a hydroxyl number of greater than 35.

To prepare the polyisocyanates mixtures according to the invention the minimum ratio of fluorine-containing compounds to diisocyanate is about 0.01 millimoles, preferably about 0.1 millimoles and more preferably about 1 millimole of fluorine-containing compounds for each mole of diisocyanate. The maximum amount of fluorine-containing compounds to diisocyanate is about 500 millimoles, preferably about 100 millimoles and more preferably about 20 millimoles of fluorine-containing compounds for each mole of diisocyanate. The amount of the mono-alcohol is selected such that the resulting polyisocyanate mixture contains a minimum of 0.001% by weight, preferably 0.01% by weight and more preferably 0.1% by weight, of fluorine (AW 19), based on solids, and a maximum of 50% by weight, preferably 10% by weight, more preferably 7% and most preferably 3% by weight of fluorine (AW 19), based on solids.

In addition to the previously described compounds containing fluorine groups, other monoalcohols and/or polyols which do not contain fluorine groups may also be used to adjust the properties and the functionality of the final products. For example, monoalcohols which do not contain fluorine may be used to reduce the viscosity of the polyisocyanate mixtures. To the contrary, alcohols having functionalities of 2 or more may be used to increase the functionality and also the viscosity of the polyisocyanate mixtures. Suitable monoalcohols and higher functional alcohols of this type have been disclosed in the previously mentioned U.S. patents.

Examples of suitable monoalcohols include methanol, ethanol, n-propanol, isopropanol, 1-butanol, 2-butanol, isobutanol and tert. butanol, n-pentanol, 2-hydroxy pentane, 3-hydroxy pentane, the isomeric methyl butyl alcohols, the isomeric dimethyl propyl alcohols, neopentyl alcohol, n-hexanol, n-heptanol, n-octanol, n-nonanol, 2-ethyl hexanol, trimethyl hexanol, cyclohexanol, benzyl alcohol, phenol, the cresols, the xylenols, the trimethylphenols, decanol, dodecanol, tetradecanol, hexadecanol, octadecanol, 2,6,8-trimethylnonanol, 2-t-butyl-cyclohexanol, 4-cyclohexyl-1-butanol, 2,4,6,-trimethyl benzyl alcohol, branched chain primary alcohols and mixtures thereof (which are available from Henkel under the Standamul trademark) and mixtures of linear primary alcohols (which are available from Shell under the Neodol trademark).

Preferred ether-containing monoalcohols include ethoxy methanol, methoxy ethanol, ethoxy ethanol, the isomeric methoxy or ethoxy propanols, the isomeric propoxy methanols and ethanols, the isomeric methoxy butanols, the isomeric butoxy methanols, furfuryl alcohol and other monoalcohols which have a molecular weight of up to 2000 and are prepared from ethylene oxide, propylene oxide and/or butylene oxide.

It is also possible in accordance with the present invention to use mixtures of the previously described monoalcohols.

When the polyisocyanates containing allophanate groups accordingly to the invention are prepared from monoalcohols containing ethylene oxide units, the polyisocyanates may be dispersed in water as described in U.S. Pat. No. 5,200,489, the disclosure of which is herein incorporated by reference.

The process according to the invention may take place either batchwise or continuously, for example, as described below. The starting diisocyanate is introduced with the exclusion of moisture and optionally with an inert gas into a suitable stirred vessel or tube and optionally mixed with a solvent which is inert to isocyanate groups such as toluene, butyl acetate, diisopropylether or cyclohexane. The previously described alcohols may be introduced into the reaction vessel in accordance with several embodiments. The alcohols may be prereacted with excess starting diisocyanate to form urethane groups prior to introducing the mixture into the reaction vessel; the alcohols may be mixed with the diisocyanates and introduced into the reaction vessel; the alcohols may be separately added to the reaction vessel either before or after, preferably after, the diisocyanates are added; or the catalysts may be dissolved in the alcohols prior to introducing the solution into the reaction vessel.

At a temperature of greater than 50° C. and in the presence of the required catalyst or catalyst solution the allophanatization reaction begins. The progress of the reaction is followed by determining the NCO content by a suitable method such as titration, refractive index or IR analysis. Thus, the reaction may be terminated at the desired degree of allophanatization. The termination of the allophanatization reaction can take place, for example, after the NCO content has fallen by 5 to 80% by weight, preferably 10 to 60% by weight and more preferably 20 to 50% by weight, based on the initial isocyanate group content of the diisocyanate starting material.

In general, when the reaction is terminated at a high NCO content, i.e., before the NCO content has been reduced significantly, the resulting polyisocyanate mixture after removal of unreacted starting diisocyanate will have a low viscosity. To the contrary if the reaction is terminated at a low NCO content, i.e., after the NCO content has fallen significantly, then the resulting product will have a high viscosity due to the formation of polyallophanates and other higher molecular weight by-products. This is especially true with regard to the known aliphatic diisocyanate starting materials. Cyclic diisocyanates result in extremely high viscosity products or solids after removal of unreacted monomer regardless of when the reaction is terminated.

The termination of the allophanatization reaction can take place, for example, by the addition of a catalyst poison of the type named by way of example in the above-mentioned literature references. For example, when using basic catalysts the reaction may be terminated by the addition of a quantity, which is at least equivalent to the catalyst quantity, of an acid chloride. The use of suspended catalysts is also possible. These catalysts are removed after achieving the desired degree of allophanatization by filtering the reaction mixture.

The working-up of the reaction mixture, optionally after previous separation of insoluble catalyst constituents, may take place in various ways depending upon how the reaction was conducted and the area of application for the isocyanates. Any solvent used during allophanatization reaction and any unreacted monomer present in the polyisocyanate product may be removed by distillation in known manner. The product obtained after distillation generally contains a total of less than 2%, preferably less than 1% of free (unreacted) monomeric diisocyanates. The products according to the invention range from low viscosity liquids having a viscosity of 50 mPa.s to high viscosity liquids to solids.

The low viscosity products are generally obtained from aliphatic diisocyanate starting materials, such as 1,6-hexamethylene diisocyanate and have a viscosity of less than 5000, preferably less than 2000 and more preferably less than 1300 mPa.s. High viscosity products may also be obtained from these diisocyanates, but the allophanatization reaction is terminated at a significantly lower NCO content. The high viscosity products have a minimum viscosity of 5000, preferably 12,000 and more preferably 15,000 mPa.s and a maximum viscosity of 100,000, preferably 90,000 and more preferably 70,000 mPa.s. The viscosities are determined at 100% solids at 25° C. Extremely highly viscous to solid products are generally obtained from cyclic diisocyanates such as isophorone diisocyanate, bis-(4-isocyanatocyclohexyl)-methane or the previously described aromatic diisocyanates.

The polyisocyanate mixtures obtained in accordance with the present invention have an isocyanurate group content (calculated as $N_3,C_3, O_3$, MW 126) Of less than 5% by weight, preferably less than 2% by weight. While it is not intended for the polyisocyanate mixtures to contain isocyanurate groups, these groups are formed during the allophanatization reaction. Even when using highly selective allophanatization catalysts, minor quantities of isocyanurate groups are formed.

The polyisocyanate mixtures have an average functionality of about 2 to 7, and may be either low or high viscosity products. The low viscosity products prepared from aliphatic diisocyanate starting materials have an average functionality of 2 to 4, preferably 2.2 to 3.3, and an NCO content of 10 to 35%, preferably 10 to 25% and more preferably 12 to 22%. The high viscosity products prepared from aliphatic diisocyanate starting materials have an average functionality of 2 to 7, preferably 2.5 to 6; an NCO content of 5 to 25%, preferably 10 to 17% and an equivalent weight which is at least 30% greater, preferably 40% greater and more preferably 50% greater, than the molecular weight of the monomeric isocyanate used to prepare the polyisocyanate mixture. The extremely highly viscous to solid products prepared from cyclic diisocyanate starting materials have an average functionality of 2 to 7, preferably 2.2 to 5, and NCO content of 10 to 40%, preferably 12 to 25% by weight.

The polyisocyanate mixtures according to the invention, which are prepared from aliphatic, cycloaliphatic or araliphatic diisocyanate starting materials, especially the low viscosity products prepared from aliphatic diisocyanate starting materials, may be almost colorless, i.e., they have a yellowness index as measured on the APHA color scale of 10 to 200, preferably 10 to 150 and more preferably 10 to 100.

The products according to the present invention are polyisocyanates containing allophanate groups and fluorine, preferably in the form of fluoroalkyl groups (e.g, —$CF_2$—). The products may also contain residual urethane groups which either are not converted to allophanate groups depending upon the temperature maintained during the allophanatization reaction and the degree of isocyanate group consumption. While it is preferred to convert at least 50%, preferably at least 70% and more preferably at least 90% of the urethane groups formed from the fluorine-containing hydroxyl compounds to allophanate groups, it is not necessary provided that the number of equivalents of allophanate groups exceeds the number of equivalents of urethane groups and provided that the polyisocyanate mixture contains sufficient allophanate groups to ensure that the polyisocyanate mixture remains stable and homogeneous in storage for 3 months at 25° C. If the polyisocyanate mixture contains an insufficient number of allophanate groups, the mixture may be cloudy and a gradual settling of insoluble constituents may take place during storage. For example, it might not be necessary to convert the urethane groups formed from the fluorine-containing hydroxyl compounds to allophanate groups when the polyisocyanate mixture contains allophanate groups formed from non-fluorine-containing monoalcohols as previously discussed.

The products according to the invention are valuable starting materials for the production of polyisocyanate polyaddition products by reaction with compounds containing at least two isocyanate reactive groups. The products according to the invention may also be moisture-cured to form coatings. Preferred products are one- or two-component coating compositions, more preferably polyurethane coating compositions. When the polyisocyanates are unblocked, two-component compositions are obtained. To the contrary when the polyisocyanates are blocked, one-component compositions are obtained.

Prior to their use in coating compositions, the polyisocyanate mixtures according to the invention may be blended with other known polyisocyanates, e.g., polyisocyanate adducts containing biuret, isocyanurate, allophanate (e.g., those which do not contain fluorine), urethane, urea, carbodiimide, and/or uretdione groups. The amount of the polyisocyanates mixtures according to the invention that must be blended with these other polyisocyanates is dependent upon the fluorine content of the polyisocyanates according to the invention, the intended application of the resulting coating compositions and the amount of low surface energy properties which are desired for this application.

To obtain low surface energy properties the resulting polyisocyanate blends should contain a minimum of 0.001% by weight, preferably 0.01% by weight and more preferably 0.1% by weight, of fluorine (AW 19), based on solids, and a maximum of 10% by weight, preferably 7% by weight and more preferably 3% by weight of fluorine (AW 19), based on solids. By knowing the fluorine content of the polyisocyanate mixtures according to the invention and the desired fluorine content of the resulting polyisocyanate blends, the relative amounts of the polyisocyanate mixtures and the other polyisocyanates may be readily determined.

In accordance with the present invention any of the polyisocyanate mixtures according to the invention can be blended with other polyisocyanates. However, preferably the polyisocyanate mixtures to be blended have a minimum fluorine content of 5% by weight, preferably 10% by weight and more preferably 20% by weight, and a maximum fluorine content of 50% by weight, preferably 45% by weight. These so-called "concentrates" may then be blended with other polyisocyanates to form polyisocyanate blends that may be used to prepare coatings having low surface energy characteristics.

There are several advantages of preparing concentrates with high fluorine contents and subsequently blending them with non-fluorine-containing polyisocyanates. Initially, it is possible to convert many products to low surface energy polyisocyanates while only producing one concentrate. By forming such low surface energy polyisocyanates by blending with concentrates, it is not necessary to separately prepare each of the products in both a fluorine-containing and a non-fluorine-containing form.

Secondly, it may not be necessary to remove unreacted starting diisocyanate following preparation of the concentrates. Commercially available polyisocyanates must contain very low amounts of unreacted starting diisocyanate as previously discussed. However, since only small amounts of concentrates with high fluorine contents need to be blended with non-fluorine-containing polyisocyanates to obtain low surface energy polyisocyanates, the required low levels of unreacted starting diisocyanate can be met without having to remove these monomers in a costly distillation step.

Preferred reaction partners for the polyisocyanate mixtures according to the invention or the resulting polyisocyanate blends are the polyhydroxy polyesters, polyhydroxy polyethers, polyhydroxy polyacrylates, polyhydroxy polylactones, polyhydroxy polyurethanes, polyhydroxy polyepoxides and optionally low molecular weight, polyhydric alcohols known from polyurethane coatings technology. Polyamines, particularly in blocked form, for example as polyketimines, oxazolidines or polyaldimines are also suitable reaction partners for the products according to the invention. Also suitable are polyaspartic acid derivatives (succinates) containing secondary amino groups, which also function as reactive diluents.

To prepare the coating compositions the amount of the polyisocyanate component and the isocyanate reactive component are selected to provide equivalent ratios of isocyanate groups (whether present in blocked or unblocked form) to isocyanate-reactive groups of about 0.8 to 3, preferably about 0.9 to 1.5.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methyl-piperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The products according to the invention are also valuable starting materials for one-component coating compositions, preferably polyurethane coating compositions, in which the isocyanate groups are used in a form blocked by known blocking agents. The blocking reaction is carried out in known manner by reacting the isocyanate groups with suitable blocking agents, preferably at an elevated temperature (e.g. about 40° to 160° C.), and optionally in the presence of a suitable catalyst, for example, the previously described tertiary amines or metal salts.

Suitable blocking agents include monophenols such as phenol, the cresols, the trimethylphenols and the tert. butyl phenols; tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidine, N-phenyl toluidine and N-phenyl xylidine; imides such as succinimide; lactams such as ε-caprolactam and δ-valerolactam; oximes such as butanone oxime, methyl amyl ketoxime and cyclohexanone oxime; mercaptans such as methyl mercaptan, ethyl mercaptan, butyl mercaptan, 2-mercaptobenzthiazole, α-naphthyl mercaptan and dodecyl mercaptan; and triazoles such as 1H-1,2,4-triazole.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

The polyisocyanate mixtures according to the invention may also be used as the polyisocyanate component in two-component water borne coating compositions. To be useful for in these compositions the polyisocyanate mixtures must be rendered hydrophilic either by blending with external emulsifiers or by a reaction with compounds containing cationic, anionic or non-ionic groups. Methods for rendering the polyisocyanates hydrophilic are disclosed in copending application, U.S. Pat. Nos. 5,194,487 and 5,200,489, the disclosures of which are herein incorporated by reference. The reduced surface tension of the modified polyiso-cyanate mixtures enhance pigment dispersion and substrate wetting.

The coating compositions containing the polyisocyanates according to the invention provide coatings which have good dry times, adhere surprisingly well to a metallic base, and are particularly light-fast, color-stable in the presence of heat and very resistant to abrasion. Furthermore, they are characterized by high hardness, elasticity, very good resistance to chemicals, high gloss, good weather resistance, good environmental etch resistance and good pigmenting qualities. Above all, the coating compositions have an excellent surface appearance and excellent cleanability.

The invention is further illustrated, but is not intended to be limited by the following examples in which all parts and percentages are by weight unless otherwise specified.

EXAMPLES

Alcohol 1

A perfluorinated polypropylene oxide, EO-capped monoalcohol, MW 757 (available from Ausimont as Galden-TX).

Alcohol 2

A perfluorinated polyether, EO-capped dialcohol, MW 2100 (available from Ausimont as Fluorolink E).

Polyisocyanate 1 - A polyisocyanate containing isocyanurate groups and prepared from HDI An isocyanurate group-containing polyisocyanate prepared from 1,6-hexamethylene diisocyanate (HDI) and having an isocyanate content of 21.6%, a content of monomeric diisocyanate of <0.2% and a viscosity at 25° C. of 3000 mPa.s (available from Miles Inc. as Desmodur N 3300).

Polyisocyanate 2- A polyisocyanate containing biuret groups and prepared from HDI A biuret group-containing polyisocyanate prepared from 1,6-hexamethylene diisocyanate and having an isocyanate content of about 23%, a content of monomeric diisocyanate of <0.7% and a viscosity at 25° C. of 1300–2200 mPa.s (available from Miles Inc. as Desmodur N 3200).

Examples 1–7

Polyisocyanates containing allophanate groups and prepared from HDI and Alcohol 1

To a 3-neck flask equipped with a gas bubbler, mechanical stirrer, thermometer and condenser were added HDI and Alcohol 1 in the molar ratio set forth in Table 1. Dry nitrogen was bubbled through the stirred reaction mixture while it was heated at 90° C. After 4 hours at 90° C. the amount of stannous octoate set forth in Table 1 was added dropwise over a 2 hour period. When the NCO content reached the value set forth in Table 1, the reaction was stopped by adding 1.5 equivalents (based on catalyst) of benzoyl chloride. Polyisocyanates were obtained having the properties set forth in Table 1.

TABLE 1

| Example | Molar Ratio HDI/ Alcohol 1 | ppm catalyst | Resin % NCO | % HDI Monomer | % Fluorine |
|---|---|---|---|---|---|
| 1 | 5 | 571 | 10 | 6.5 | 28 |
| 2 | 5 | 857 | 12.1 | 10.5 | 28 |
| 3 | 5 | 2500 | 17.8 | 27.4 | 28 |
| 4 | 4 | 2500 | 14.9 | 21 | 31 |
| 5 | 3 | 2500 | 13.1 | 19.1 | 35 |
| 6 | 2 | 407 | 9 | 14.3 | 40 |
| 7 | 1.5 | 2500 | 6.4 | 8.5 | 43 |

Examples 8–13

Blends of fluorine-containing and non-fluorine-containing polyisocyanates 2.8 parts of the polyisocyanate from Example 5 were blended with 97.2 parts of Polyisocyanate 1 to produce a polyisocyanate mixture (Example 8) having the properties set forth in Table 2. This polyisocyanate mixture was further diluted with Polyisocyanate 1 to produce a series of polyisocyanate mixtures (Examples 9–12) having the properties set forth in Table 2.

TABLE 2

| Example | % Polyisocyanate from Ex. 8 | % Polyisocyanate 1 | % HDI Monomer | % F | Surface Tension (Dynes/cm) |
|---|---|---|---|---|---|
| 8 | 100 | 0 | 0.62 | 1.0 | 27.9 |
| 9 | 80 | 20 | 0.46 | 0.8 | 28.9 |
| 10 | 60 | 40 | 0.36 | 0.6 | 28.1 |
| 11 | 40 | 60 | 0.26 | 0.4 | 28 |
| 12 | 20 | 80 | 0.15 | 0.2 | 33.9 |
| 13 (Comp) | 0 | 100 | 0.05 | 0.0 | 48.6 |

It is apparent from the data set forth in Table 2 that fluorine-containing polyisocyanates can be blended with commercially available polyisocyanates containing isocyanurate groups to produce polyisocyanate mixtures which have reduced surface tension.

Examples 14–19

Blends of fluorine-containing and non-fluorine-containing polyisocyanates 2.8 parts of the polyisocyanate from Example 5 were blended with 97.2 parts of Polyisocyanate 2 to produce a polyisocyanate mixture (Example 14) having the properties set forth in Table 3. This polyisocyanate mixture was further diluted with Polyisocyanate 1 to produce a series of polyisocyanate mixtures (Examples 15–18) having the properties set forth in Table 3.

TABLE 3

| Example | % Polyisocyanate from Ex. 14 | % Polyisocyanate 2 | % HDI Monomer | % F | Surface Tension (Dynes/cm) |
|---|---|---|---|---|---|
| 14 | 100 | 0 | 1.2 | 1.0 | 20.6 |
| 15 | 80 | 20 | 1 | 0.8 | 20.9 |
| 16 | 60 | 40 | 0.98 | 0.6 | 20.7 |
| 17 | 40 | 60 | 0.89 | 0.4 | 21.4 |
| 18 | 20 | 80 | 0.79 | 0.2 | 21 |
| 19 (Comp) | 0 | 100 | 0.72 | 0.0 | 49.6 |

It is apparent from the data set forth in Table 3 that fluorine-containing polyisocyanates can be blended with commercially available polyisocyanates containing biuret groups to produce polyisocyanate mixtures which have reduced surface tension.

Example 20

A polyisocyanate containing allophanate groups and prepared from HDI, Alcohol 1 and 1-butanol To a 3-neck flask equipped with a gas bubbler, mechanical stirrer, thermometer and condenser were added 100 parts of HDI, 50 parts of Alcohol 1 and 12 pads of 1-butanol. Dry nitrogen was bubbled through the stirred reaction mixture while it was heated at 120° C. After 6 hours at 120° C., 294 ppm of stannous octoate was added dropwise over a 6 hour period. When the NCO content reached 18.4%, the reaction was stopped by adding 300 ppm of benzoyl chloride. A clear polyisocyanate was obtained containing 22.3% HDI monomer. The surface tension of this polyisocyanate and the surface energy of a coating prepared from this polyisocyanate are set forth in Table 5 following Examples 30 and 31.

Example 21

(Comparison) A polyisocyanate containing isocyanurate and allophanate groups and prepared from HDI and 1-butanol A polyisocyanate containing isocyanurate groups and allophanate groups was prepared by adding 301.7 parts of hexamethylene diisocyanate and 13.3 parts of 1-butanol to a 500 ml 3-neck flask equipped with a gas bubbler, mechanical stirrer, thermometer and condenser. The stirred mixture was heated for 1 hour at 60° C. while dry nitrogen was bubbled through the reaction mixture. The temperature of the reaction mixture was then raised to 90° C. To the reaction mixture at 90° C. were added 0.214 parts of a 4.4% solution of N,N,N-trimethyl-N-benzyl-ammonium hydroxide in 1-butanol. When the reaction mixture reached an NCO content of 34.8%, the reaction was stopped by adding 0.214 parts of di-(2-ethylhexyl)-phosphate. The excess monomer was removed by thin film evaporation to provide an almost colorless, clear liquid having a viscosity of 630 mPa.s (25° C.), an NCO content of 19.7% and a free monomer (HDI) content of 0.35%. The yield was 48.6%. The surface tension of this polyisocyanate and the surface energy of a coating prepared from this polyisocyanate are set forth in Table 5 following Examples 30 and 31.

Example 22

A polyisocyanate containing allophanate groups and prepared from MDI, Alcohol 1 and 1-butanol To a 3-neck flask equipped with a gas bubbler, mechanical stirrer, thermometer and condenser were added a mixture of MDI (98 parts of 4,4'-diphenyl methane diisocyanate and 2 parts of 2,4'-diphenyl methane diisocyanate), 0.2 parts of Alcohol 1 and 7.8 parts of 1-butanol. Dry nitrogen was bubbled through the stirred reaction mixture while it was heated at 90° C. After 2 hours at 90° C., 50 ppm of zinc acetylacetonate was added in one portion. When the NCO content reached 23.0%, the reaction was stopped by adding 100 ppm of benzoyl chloride, and cooled to 25° C. A light yellow polyisocyanate was obtained having a viscosity of 198 mPa.s at 25° C. and an NCO content of 23.0%. To this polyisocyanate was added 65.4 parts of MDI resulting in a light yellow polyisocyanate having a viscosity of 61 mPa.s and an NCO content of 27.0%. The surface tension of this polyisocyanate and the surface energy of a coating prepared from this polyisocyanate are set forth in Table 6 following Examples 32–34.

Example 23

A polyisocyanate containing allophanate groups and prepared from MDI, Alcohol 2 and 1-butanol To a 3-neck flask equipped with a gas bubbler, mechanical stirrer, thermometer and condenser were added 100 parts of MDI, 1.5 parts of Alcohol 2 and 4.7 parts of 1-butanol. Dry nitrogen was bubbled through the stirred reaction mixture while it was heated at 90° C. After 2 hours at 90° C, 50 ppm of zinc acetylacetonate was added in one portion. When the NCO content reached 26.8%, the reaction was stopped by adding 100 ppm of benzoyl chloride, and cooled to 25° C. A hazy, light yellow polyisocyanate was obtained having a viscosity of 57 mPa.s at 25° C. and an NCO content of 26.8%. To this polyisocyanate was added 65.4 parts of MDI resulting in a light yellow polyisocyanate having a viscosity of 61 mPa.s and an NCO content of 27.0%. The surface tension of this polyisocyanate and the surface energy of a coating prepared from this polyisocyanate are set forth in Table 6 following Examples 32–34.

Example 24

(Comparison) A polyisocyanate containing allophanate groups and prepared from MDI and 1-butanol To a 3-neck flask equipped with a gas bubbler, mechanical stirrer, thermometer and condenser were added 100 parts of MDI and 5.4 parts of 1-butanol. Dry nitrogen was bubbled through the stirred reaction mixture while it was heated at 90° C. After 2 hours at 90° C., 50 ppm of zinc acetylacetonate was added in one portion. When the NCO content reached 26.0%, the reaction was stopped by adding 100 ppm of benzoyl chloride, and cooled to 25° C. The resulting light yellow polyisocyanate had a viscosity of 72 mPa.s at 25° C. and an NCO content of 26.0%. The surface tension of this polyisocyanate and the surface energy of a coating prepared from this polyisocyanate are set forth in Table 6 following Examples 32–34.

Example 25

A blend of fluorine-containing and non-fluorine-containing polyisocyanates 4.3 parts of the polyisocyanate from Example 1 were blended with 95.7 parts of Polyisocyanate 1 to produce a polyisocyanate mixture having an NCO content of 20.8%, a free monomer content of 0.33% and a fluorine content of 1%. The surface tension of this polyisocyanate mixture and the surface energy of a coating prepared from this polyisocyanate mixture are set forth in Table 7 following Examples 35 and 36.

Example 26

A polyisocyanate containing urethane groups and prepared from HDI and 1-butanol

To a 3-neck flask equipped with a gas bubbler, mechanical stirrer, thermometer and condenser were added 100 parts of HDI, 5 parts of Alcohol 1 and 50 ppm of dibutyltin dilaurate. Dry nitrogen was bubbled through the stirred reaction mixture while it was heated at 50° C. When the NCO content reached 47.1%, the reaction was stopped by cooling the reaction mixture to room temperature. The excess monomer was removed by thin film evaporation to provide a light brown waxy solid having a free monomer content of 1.5% and a fluorine content of 40%.

Example 27

(Comparison) A blend of fluorine-containing and non-fluorine-containing polyisocyanates 2.5 parts of the monourethane from Example 26 were blended with 97.5 parts of Polyisocyanate 1 to produce a polyisocyanate mixture having an NCO content of 20.8%, a free monomer content of 0.12% and a fluorine content of 1%. The surface tension of this polyisocyanate mixture and the surface energy of a coating prepared from this polyisocyanate mixture are set forth in Table 7 following Examples 35 and 36.

Examples 28 and 29

Coatings prepared from the polyisocyanates of Examples 8 and 14

Coating compositions containing a hydroxyl-functional polyacrylate present as 70% solution in n-butyl acetate and having an average solution equivalent weight of 607 (Desmophen A LS-2945, available from Miles) and the polyisocyanates set forth in Table 4 were prepared such that the NCO:OH equivalent ratio was 1.1:1. The coating compositions were reduced to 70% solids with Exxate 700 solvent (available from Exxon), n-butyl acetate and methyl amyl ketone (1:4:1) and allowed to react for five minutes. At that time, coatings having a 5 mil wet film thickness were drawdown onto cold rolled steel and onto glass and allowed to cure for two weeks at 70° F. and 55% relative humidity. The properties of the coatings are set forth in Table 4.

TABLE 4

| Example | Polyisocyanate from Example | Polyisocyanate Surface Tension (Dynes /cm) | Film Surface Energy | MEK Double Rubs | Pendulum Hardness |
|---|---|---|---|---|---|
| 28 | 8 | 27.9 | 21.6 | >200 | 219.8 |
| 29 | 14 | 20.6 | 20 | >200 | 219.8 |

Examples 30–31

Coatings prepared from the polyisocyanates of Examples 20 and 21

Coatings based on the polyisocyanates of Examples 20 and 21 were prepared and cured as described in Examples 28 and 29. The properties of the coatings are set forth in Table 5.

TABLE 5

| Example | Polyisocyanate from Example | Polyisocyanate Surface Tension (Dynes/cm) | Film Surface Energy |
|---|---|---|---|
| 30 | 20 | 21.2 | 19.4 |
| 31 (Comp) | 21 (Comp) | 43.3 | 43.6 |

These examples demonstrate that polyisocyanates containing allophanate groups, but which do not contain fluorine, are not suitable for the production of coatings with low surface energy.

Examples 32–34

Coatings prepared from the polyisocyanates of Examples 22–24

A blend of 90 parts of a 100% solids, hydroxy-functional polyester having an average equivalent weight of 340 (Desmophen 1150, available from Miles) and 10 parts of a drying paste (Baylith L, available from Miles) was prepared and allowed to digest overnight. To separate portions of these blends were added the aromatic polyisocyanates set forth in Table 5 at an NCO:OH equivalent ratio was 1.05:1. The coating compositions were allowed to digest for a period of five minutes and then coatings having a 5 mil wet film thickness were drawdown onto cold rolled steel and allowed to cure for two weeks at 70° F. and 55% relative humidity. The properties of the coatings are set forth in Table 6.

TABLE 6

| Example | Polyisocyanate from Example | Polyisocyanate Surface Tension (Dynes/cm) | Film Surface Energy | Pendulum Hardness |
|---|---|---|---|---|
| 32 | 22 | 26.2 | 33.6 | 67.2 |
| 33 | 23 | 28.3 | 32.3 | 68.6 |
| 34 (Comp) | 24 (Comp) | 48.7 | | 68.6 |

These examples demonstrate that polyisocyanates containing allophanate groups, but which do not contain fluorine, are not suitable for the production of coatings with low surface energy.

Examples 35–36

Coatings prepared from the polyisocyanates of Examples 25 and 27

Coatings based on the polyisocyanates of Examples 25 and 27 were prepared and cured as described in Examples 28 and 29. The properties of the coatings are set forth in Table 7.

TABLE 7

| Example | Polyisocyanate from Example | Polyisocyanate Surface Tension (Dynes/cm) | Film Surface Energy |
|---|---|---|---|
| 35 | 25 | 28.2 | 20.1 |
| 36 (Comp) | 27 (Comp) | 33.7 | 27.1 |

These examples demonstrate that polyisocyanates containing urethane groups and fluorine are not as effective for the production of coatings with low surface energy as polyisocyanates containing allophanate groups and fluorine.

Surface Energy Measurements

All reported liquid (resin) surface energies (in dynes/cm) were obtained using the ring or Du Noüy method. In this static method, the force applied on a thin platinum ring was measured using a tensiometer.

All reported solid (coating) surface energies (in dynes/cm) were obtained by the Owens-Wendt procedure. The contact angle of two solvents (water and methylene iodide) were measured with a goniometer. Several readings were taken and averaged. The averages were then used to calculate the solid surface energy of the coating, taking into account the contributions of polar and dispersive forces.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate mixture
   i) having an NCO content of 5 to 35% by weight and prepared from an organic diisocyanate,
   ii) containing less than 5% by weight of isocyanurate groups (calculated as $N_3,C_3,O_3$, MW 126),
   iii) containing allophanate groups in an amount such that there are more equivalents of allophanate groups than urethane groups and
   iv) containing fluorine (calculated as F, AW 19) in an amount of 0.001 to 50% by weight, based on solids,
   wherein the preceding percentages are based on the solids content of the polyisocyanates, excluding any unreacted organic diisocyanate, and wherein fluorine is incorporated by reacting an isocyanate group with a compound containing two or more carbon atoms, one or more hydroxyl groups and one or more fluorine atoms to form urethane groups and converting a sufficient amount of these urethane groups to allophanate groups to satisfy the requirements of iii), provided that the polyisocyanate mixture contains sufficient allophanate groups to ensure that the polyisocyanate mixture remains stable and homogeneous in storage for 3 months at 25° C.

2. The polyisocyanate mixture of claim 1 wherein said organic diisocyanate comprises 1,6ohexamethylene diisocyanate.

3. The polyisocyanate mixture of claim 1 which contains less than 10% by weight, based on solids, of fluorine.

4. The polyisocyanate mixture of claim 2 which contains less than 10% by weight, based on solids, of fluorine.

5. The polyisocyanate mixture of claim 1 which has a viscosity of less than 5000 mPa.s at 25° C. and contains 20 to 50% by weight, based on solids, of fluorine.

6. The polyisocyanate mixture of claim 2 which has a viscosity of less than 5000 mPa.s at 25° C. and contains 20 to 50% by weight, based on solids, of fluorine.

7. A polyisocyanate mixture
   i) having an NCO content of 5 to 35% by weight, based on solids, and prepared from an organic diisocyanate,
   ii) containing less than 5% by weight of isocyanurate groups (calculated as $N_3, C_3, O_3$, MW 126),
   iii) containing allophanate groups in an amount such that there are more equivalents of allophanate groups than urethane groups and
   iv) containing fluorine (calculated as F, AW 19) in an amount of 0.001 to 50% by weight, based on solids,
   wherein fluorine is incorporated by reacting an isocyanate group with a compound containing two or more carbon atoms, one hydroxyl group and two or more fluorine atoms in the form of $—CF_2—$ groups to form urethane groups and converting at least 70% of said urethane groups to allophanate groups to satisfy the requirements of iii).

8. The polyisocyanate mixture of claim 7 wherein said organic diisocyanate comprises 1,6-hexamethylene diisocyanate.

9. The polyisocyanate mixture of claim 7 which contains less than 10% by weight, based on solids, of fluorine.

10. The polyisocyanate mixture of claim 8 which contains less than 10% by weight, based on solids, of fluorine.

11. The polyisocyanate mixture of claim 7 which has a viscosity of less than 5000 mPa.s at 25° C. and contains 20 to 50% by weight, based on solids, of fluorine.

12. The polyisocyanate mixture of claim 8 which has a viscosity of less than 5000 mPa.s at 25° C. and contains 20 to 50% by weight, based on solids, of fluorine.

13. A process for the production of a polyisocyanate mixture having an NCO content of 5 to 35% by weight and prepared from an organic diisocyanate,
   ii) containing less than 5% by weight of isocyanurate groups (calculated as $N_3, C_3,)O_3$, MW 126),
   iii) containing allophanate groups in an amount such that there are more equivalents of allophanate groups than urethane groups and
   iv) containing fluorine (calculated as F, AW 19) in an amount of 0.001 to 50% by weight,
   wherein the preceding percentages are based on the solids content of the polyisocyanate mixture, excluding any unreacted organic diisocyanate, which comprises
   a) reacting a portion of the isocyanate groups of an organic diisocyanate with 0.01 to 500 millimoles, per mole of organic diisocyanate, of a compound containing two or more carbon atoms, one or more hydroxyl groups and one or more fluorine atoms to the organic diisocyanate to form urethane groups,
   b) adding an allophanatization catalyst prior to, during or after step a),
   converting a sufficient amount of the urethane groups formed in step a) to allophanate groups such that there are more equivalents of allophanate groups than urethane groups,
   d) terminating the allophanatization reaction at the desired degree of allophanatization by adding a catalyst poison and/or by thermally deactivating the catalyst and
   e) optionally removing unreacted organic diisocyanate.

14. A polyisocyanate composition containing
   A) a polyisocyanate mixture
      i) having an NCO content of 5 to 35% by weight and prepared from an organic diisocyanate,
      ii) containing less than 5% by weight of isocyanurate groups (calculated as $N_3, C_3, O_3$, MW 126),
      iii) containing allophanate groups in an amount such that there are more equivalents of allophanate groups than urethane groups and
      iv) containing fluorine (calculated as F, AW 19) in an amount of 20 to 50% by weight, based on solids,
      wherein the preceding percentages are based on the solids content of the polyisocyanates, excluding any unreacted organic diisocyanate, and
      wherein fluorine is incorporated by reacting an isocyanate group with a compound containing two or more carbon atoms, one or more hydroxyl groups and one or more fluorine atoms to form urethane groups and converting a sufficient amount of these urethane groups to allophanate groups to satisfy the requirements of iii), provided that the polyisocyanate mixture contains sufficient allophanate groups to ensure that the polyisocyanate mixture remains stable and homogeneous in storage for 3 months at 25° C, and
   B) a polyisocyanate adduct containing biuret, isocyanurate, allophanate, urethane, urea, carbodiimide and/or uretdione groups,
   wherein component A) and B) are present in amounts such that said polyisocyanate composition has a fluorine content, based on solids, of 0.001 to 10% by weight.

15. The polyisocyanate composition of claim 14 wherein said organic diisocyanate comprises 1,6-hexamethylene diisocyanate.

16. The polyisocyanate composition of claim 14 wherein said polyisocyanate adduct is based on 1,6-hexamethylene diisocyanate and contains biuret and/or isocyanurate groups.

17. The polyisocyanate composition of claim 15 wherein said polyisocyanate adduct is based on 1,6-hexamethylene diisocyanate and contains biuret and/or isocyanurate groups.

18. The polyisocyanate composition of claim 14 wherein said polyisocyanate adduct is based on 1,6-hexamethylene diisocyanate and isocyanurate groups and optionally allophanate groups.

19. The polyisocyanate composition of claim 15 wherein said polyisocyanate adduct is based on 1,6-hexamethylene diisocyanate and contains isocyanurate groups and optionally allophanate groups.

20. A one- or two-component coating composition containing the polyisocyanate mixture of claim 1, optionally blocked by blocking agents for isocyanate groups, and a compound containing isocyanate-reactive groups.

* * * * *